Dec. 1, 1931.  C. DOMENIGONI  1,834,830
SIGNAL
Filed Sept. 4, 1928  3 Sheets-Sheet 1
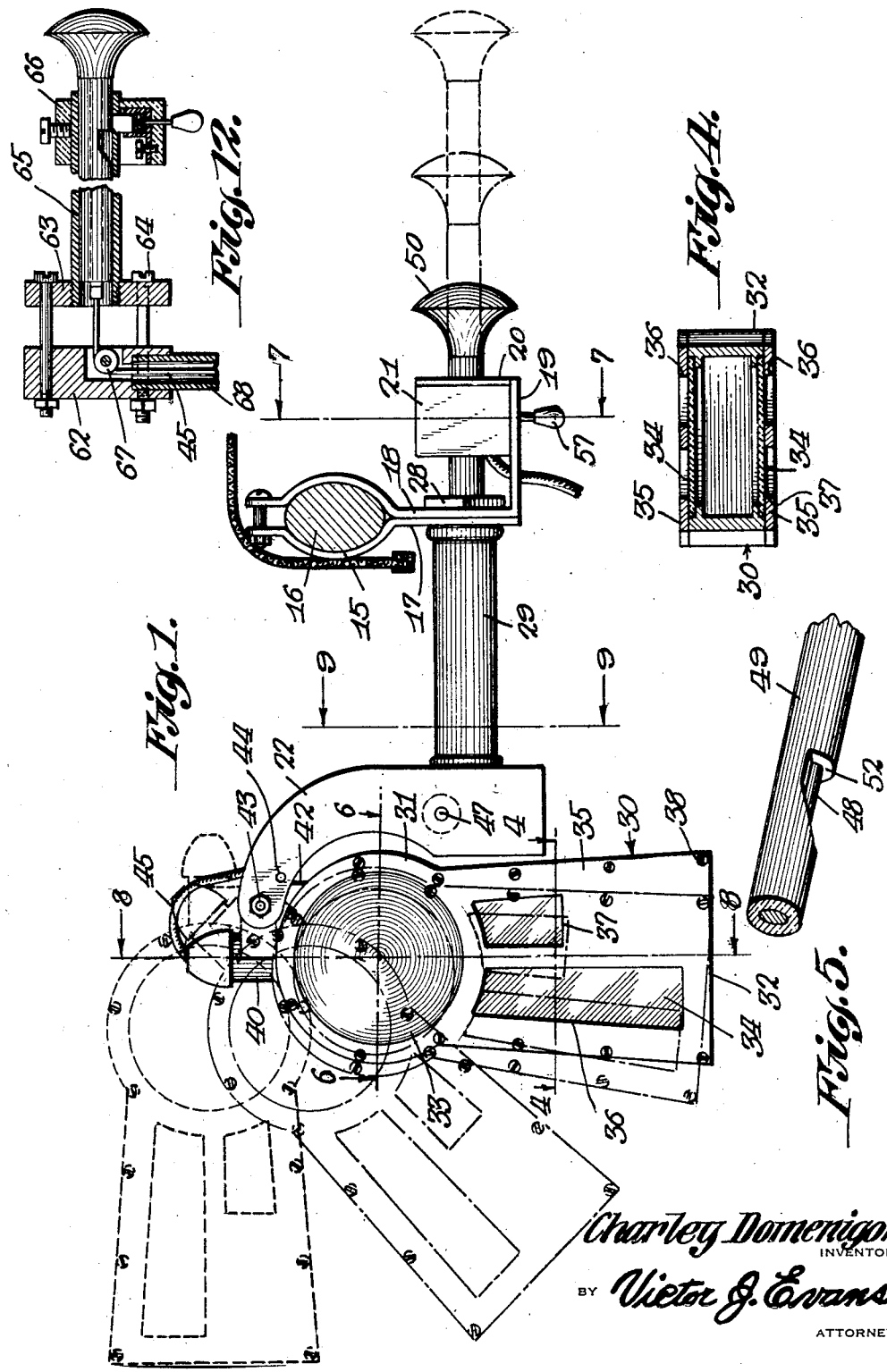

Dec. 1, 1931.          C. DOMENIGONI          1,834,830
SIGNAL
Filed Sept. 4, 1928          3 Sheets-Sheet 2
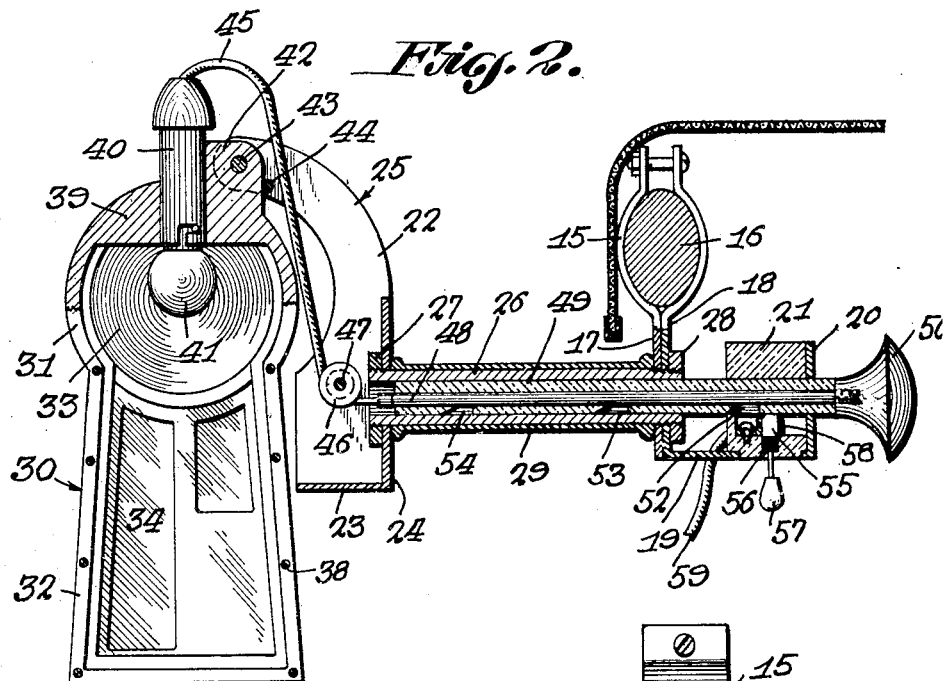
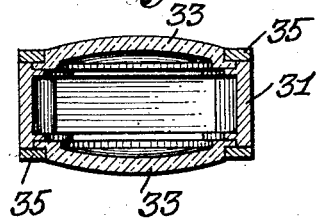
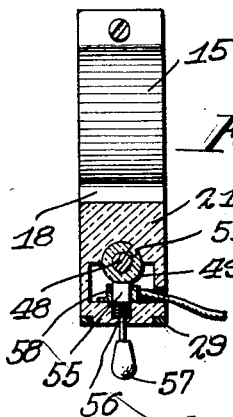
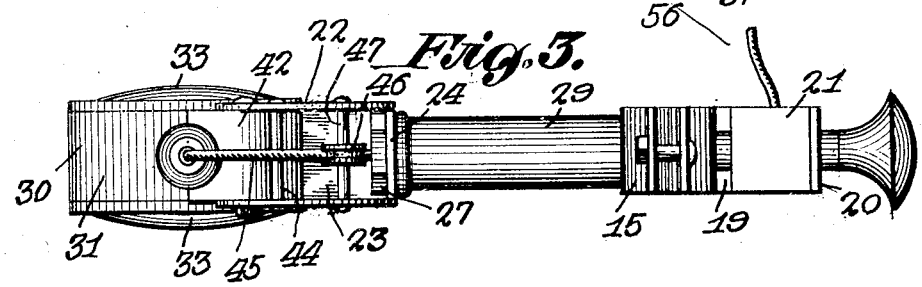
Charley Domenigoni,
INVENTOR
BY Victor J. Evans
ATTORNEY Dec. 1, 1931.  C. DOMENIGONI  1,834,830
SIGNAL
Filed Sept. 4, 1928  3 Sheets-Sheet 3

Charley Domenigoni,
INVENTOR
BY Victor J. Evans
ATTORNEY

Patented Dec. 1, 1931

1,834,830

UNITED STATES PATENT OFFICE

CHARLEY DOMENIGONI, OF SAN BERNARDINO, CALIFORNIA

SIGNAL

Application filed September 4, 1928. Serial No. 303,729.

My present invention has reference to a traffic signal designed to be attached to a vehicle and to be operated by the driver thereof to denote intended change of movement of the vehicle.

A further object is the provision of a traffic signaling device which may be attached to either the opened or closed types of automobiles or like vehicles, and which includes a semaphore arm which is normally sustained by its own weight in a downward vertical position but which may be readily swung by simple means arranged conveniently with respect to the driver of the vehicle to bring the same to different angles to indicate to traffic that the vehicle is to stop or is to turn to either the right or left and further wherein the semaphore arm is illuminated when turned to any of such positions and which will direct therefrom red and white rays of light so that the position of the signal and the intention of the driver cannot be mistaken by traffic either in front or to the rear of the vehicle.

The invention will be fully and comprehensively understood from a consideration of the following detailed description when read in connection with the acompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a side elevation of the improvement, the dotted lines indicating the various angles at which the semaphore arm may be swung.

Figure 2 is an approximately central vertical longitudinal sectional view through the improvement.

Figure 3 is a top plan view of the improvement.

Figure 4 is a sectional view approximately on the line 4—4 of Figure 1.

Figure 5 is a fragmentary perspective view of the pull rod of insulating material with the metal core therein.

Figure 6 is a sectional view approximately on the line 6—6 of Figure 1.

Figure 7 is a sectional view approximately on the line 7—7 of Figure 1.

Figure 12 is a detail sectional view to illustrate another manner in which the improvement may be attached on the vehicle.

Figure 8:
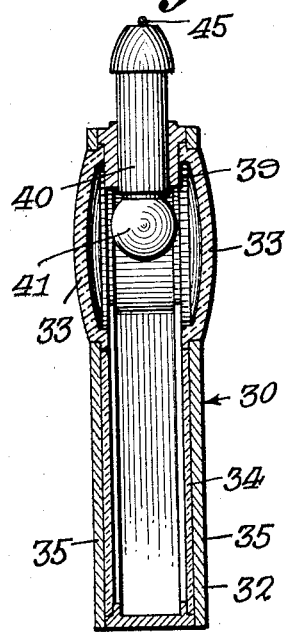
Figure 8 is a sectional view approximately on the line 8—8 of Figure 1.

When my improvement is arranged upon vehicles of the open type I attach to one of the horizontal bars or rods that support the top of the vehicle, on the left hand side of the vehicle, a split clamp 15. The clamp, as a matter-of-fact, comprises two members, each of which has an enlarged portion to engage with the cross sectionally elliptical bar 16 of the vehicle frame and each of the said members having straight extensions through which are passed binding means such as an ordinary bolt engaged by a nut. From the arched portions each of the clamp sections is provided with depending straight arms 17 and 18, respectively, which are disposed in contacting engagement. The arm 18, on the inner clamp section has its lower end extended angularly, as at 19, and merges into an upwardly directed flange 20.

The plate 19 and the flange 20 support thereon and have securely fixed thereto a block 21. By reference to Figure 2 of the drawings it will be seen that the block 21 has its lower end formed with a reduced extension which is received through the plate 19.

Arranged at a suitable distance from the outer side of the vehicle there is an upwardly directed bracket 22. The bracket comprises spaced sides connected at their lower ends, as indicated by the numeral 23 and at their rear edges by a back plate 24. The upper portions of the sides of the bracket provide spaced curved arms 25, respectively.

Passing through a suitable opening in the back plate 24 of the hollow bracket and through alining openings in the depending plates 17 and 18 of the clamp 15 there is a tubular member 26 that has its ends threaded and engaged by nuts 27 and 28. Arranged around the tubular member 26 and contacting with the back plate 24 of the bracket and with the depending plate 17 of the clamp there is a spacer sleeve 29. By adjusting the nuts it will be noted that the bracket 22 is firmly supported on and spaced from the clamp 15, the binding effect between the nuts 27 and the sleeve 29 being sufficient to hold the bracket 22 from turning on the tube 26, but preferably there is arranged between these elements splines or like devices to positively prevent the turning of the bracket on the tube.

The semaphore or signal member is broadly indicated by the numeral 30. By reference to the drawings it will be seen that this member is in the nature of a shell or frame, the upper portion of which being rounded, as at 31, and the lower portion 32 being of substantially rectangular formation, although the side walls of the said portion 32 are preferably gradually inclined away from each other to the bottom of the said portion 32. The sides of the signal shell or frame 30 have their inner edges formed with continuous depressions, the rounded depressions receiving therein the reduced and flanged edges of red colored lenses 33, while the depressions in the extending or body portion 32 of the frame or shell receive therein panes of white or frosted glass 34. The sides of the shell or frame are closed by plates 35, respectively, the said plates, of course, corresponding to the shape of the shell and having their rounded portions provided with openings for the lenses 34 and their body portions provided with spaced openings 36 and 37, respectively. The opening 36 is of a materially greater length than the opening 37 and these openings, covering the white or frosted plate or lenses 34 give the lower or outer portion of the signal the appearance of a pointed and a bent finger. The plates 35 are removably secured to the shell by short bolts or screws 38. The rounded portion of the shell of the signal has its top thickened inwardly, as at 39, the said thickened portion having an opening therethrough for the socket 40 of a lamp bulb 41.

The top of the signal, to one side of the socket 40 is integrally formed with an upwardly directed lug 42 and this lug is pivoted, as at 43, between the arms 25 of the bracket 22. Secured between the arms and designed to be contacted by the outer edge of the lug 42 there is a stop pin 44 which limits the swinging of the signal in its downward direction, the weight of the signal influencing the same to such position. When the signal is thus sustained pendent approximately one-half of the rounded top of the signal will be received in the concaved outer edge of the arms 25 of the bracket 22.

The insulated conductor cord for the bulb 41 is indicated by the numeral 45. This cord is directed under a grooved wooden pulley 46 which is pivoted, as at 47, between the arms of the bracket, the said groove pulley 46 having its lower portion arranged approximately in a line with the longitudinal axis of the tube 26. The insulating casing for the conductor wires is removed so that the said wires are connected to a metal rod 48. This rod is received in and provides a core for a hard rubber or like insulator rod or tube 49 which is freely guided through the tube 26 and likewise guided through an opening in the block 21. The end of the metal rod is screwed into a pull handle 50 of insulating material, and the said handle contacts and may be secured to the end of the insulator tube or rod 49.

Figure 9:
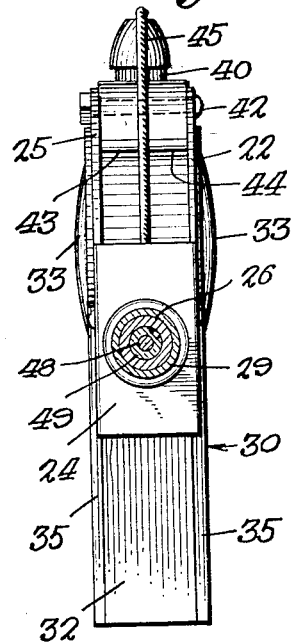
Figure 9 is a sectional view approximately on the line 9—9 of Figure 1.

By reference to Figure 9 of the drawings it will be seen that the insulator rod 49 is provided with a longitudinal groove that receives therein a key or spline 51 carried by the tube 26 so that the said insulator rod and its core cannot turn in the tube 26.

The insulator rod on its lower face is provided with three spaced notches 52, 53 and 54, respectively, the inner wall of each of the notches being straight and the outer walls being arranged at an angle. These notches communicate with the metal rod 48.

The block 21 is of insulating material and has arranged for slidable movement therein a metal dog 55. This dog is influenced by a spring 56 in the direction of the insulator rod 49. The dog has on its under face a pull element or rod to which is attached an insulating handle 57. The dog is slidable through a metal sleeve 58 which is secured in the block 21, there being a frictional engagement between the said sleeve and dog, but not sufficient to prevent the spring 56 from urging the dog in the direction of the rod 49. Attached to the metal sleeve 58 there is the encased wire or wires 59 that are connected to the electric system of the automobile. The dog and its guide sleeve 58 provide a circuit maker.

When the device is in its normal inactive position, as illustrated by the full lines in Figures 1, 2 and 3 of the drawings, the notch 52 is disposed only a slight distance away from the slidable switch or dog 55. A pull upon the knob or handle 50 will bring the dog or switch 55 into the notch 52, causing the said dog or switch to contact with the metal rod 48 and thus completing a circuit to the lamp bulb 41. Of course, the pulling on the rod 49 swings the signal to the lower dotted line position in Figure 1 of the drawings, so that traffic to the rear of the vehicle will be warned that the said vehicle is to stop. Preferably the outer corner of the slidable switch or dog 55 is beveled, as disclosed by Figure 2 of the drawings. This permits of the rod being drawn further into the vehicle until the slidable switch or dog 55 is received in the second notch 53. This again completes the circuit and swings the signal to its second positon to indicate that the vehicle is to turn to the left. A still further pull upon the rod will bring the circuit making dog or switch 55 into the third notch 54 and against the rod 48, the pull upon the rod causing the signal to be swung to its outermost position to indicate that the vehicle is to make a turn to the right, and likewise completing the electric circuit to the lamp.

In all of its signaling positions it will be noted that the rays of light from the lamp will be directed through the red lenses 33 and through the white or frosted lenses or plates 34, so that in both night and day driving traffic to the front or rear of the vehicle will have full knowledge of the intention of the driver of the vehicle as to any intended change of movement of the said vehicle.

Obviously a pull must be exerted upon the handle 57 to bring the circuit making dog or switch 55 out of the notches in the rod 49, and the weight of the signal arm will automatically return the same to its initial and unsignaling position.

Figure 10:
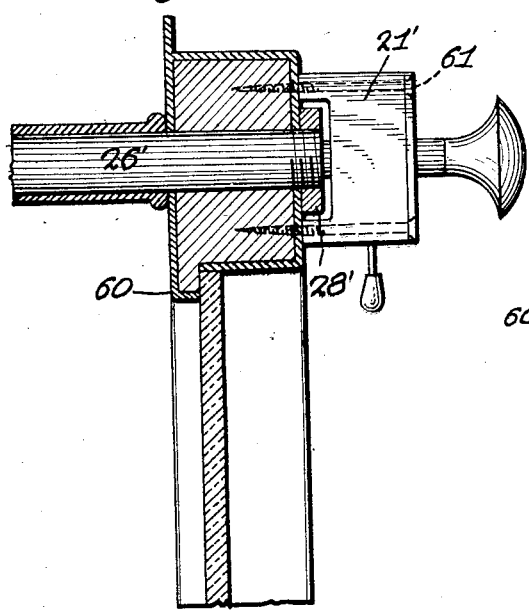
Figure 10 is a sectional view on the line 10—10 of Figure 11.
Figure 11:
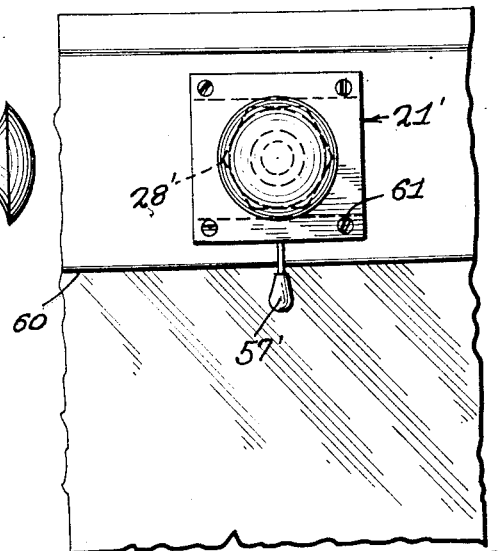
Figure 11 is an inner face view of the device as disclosed by Figure 10.

In Figures 10 and 11 I have illustrated the manner in which the device may be attached to the rail of a door 60 of a closed type of vehicle. The construction and operation of parts is similar to that previously described, except that the insulating block 21' has its inner face notched to receive therein the inner locking nut 28' for the tubular member 26' through which is guided the notched insulator rod with the metal core, the block 21' being also fixed by screws 61 to the inner face of the stile of the door, it being understood, of course, that the tubular member 26' passes through the said stile.

In Figure 12 I have shown a different manner of attaching the improvement to any desired part of a vehicle. In this instance, the construction in the main is similar to that previously described, except that I employ two spaced plates 62—63, connected by bolts 64 and arranged upon the respective outer and inner faces of the vehicle. The tubular member 65 is similar to the tubes 26 and 26' and is threaded through the inner plates 63 and has fixed thereon the insulator block 66, similar to the block 21 and 21'. The outer plate 62 has its inner face recessed to provide a pocket for a pulley 67 of insulating material, over which the cord or cable 45' is trained, the said cable being directed through a tube 68 which is screwed or otherwise secured in the lower face of the plate 62.

The cable 45' is suitably guided to the socket 40 in the top of the signal and the said signal is similar to that previously described.

It should be stated that the white glasses on the signal may be constructed of celluloid, isinglass or other transparent material.

Having described the invention, I claim:

A signal comprising a hollow shell member having transparencies and an upper end weighted by a thickened portion, a supporting arm pivoted to said thickened portion at a point to one side of the median longitudinal dimension of the shell member, a socket member passing through said thickened portion upon the median longitudinal dimension of the shell member and adapted to support a bulb interiorly of the shell member said socket member being disposed transversely across the axis of the pivotal connection between the arm and the shell, a cord entering the socket member and a pulling mechanism attached to said cord.

In testimony whereof I affix my signature.

CHARLEY DOMENIGONI.